(12) United States Patent
Takasaka et al.

(10) Patent No.: US 11,376,764 B2
(45) Date of Patent: Jul. 5, 2022

(54) MOLD COOLING CIRCUIT DESIGNING METHOD, MOLD MANUFACTURING METHOD, MOLD COOLING CIRCUIT DESIGNING APPARATUS, AND COMPUTER READABLE MEDIUM

(71) Applicant: TOYOTA JIDOSHA KABUSHIKI KAISHA, Toyota (JP)

(72) Inventors: Hironori Takasaka, Hamamatsu (JP); Yusuke Uehashi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 16/901,753

(22) Filed: Jun. 15, 2020

(65) Prior Publication Data

US 2021/0008764 A1  Jan. 14, 2021

(30) Foreign Application Priority Data

Jul. 11, 2019  (JP) .............................. JP2019-129056

(51) Int. Cl.
    *G06G 7/48*     (2006.01)
    *B29C 33/38*     (2006.01)
    (Continued)

(52) U.S. Cl.
    CPC .......... *B29C 33/3835* (2013.01); *B29C 33/04* (2013.01); *B29C 33/3842* (2013.01);
    (Continued)

(58) Field of Classification Search
    CPC ................ B29C 33/04; B29C 33/3835; B29C 33/3842; B29C 35/16; G06F 2113/14;
    (Continued)

(56) References Cited

U.S. PATENT DOCUMENTS

2013/0060529 A1*   3/2013   Li .......................... G06F 30/17
                                                                             703/1

FOREIGN PATENT DOCUMENTS

ER     0 443 437 A2     8/1991
JP     03-240507 A     10/1991
(Continued)

OTHER PUBLICATIONS

Zhang, Yingming, et al. "Automatic design of conformal cooling channels in injection molding tooling." IOP Conference Series: Materials Science and Engineering. vol. 307. No. 1. IOP Publishing, 2018.*

Zhang, Yingming, et al. "Automatic generation of venting system on complex surfaces of injection mold." The International Journal of Advanced Manufacturing Technology 98.5 (2018): 1379-1389.*

(Continued)

*Primary Examiner* — Rehana Perveen
*Assistant Examiner* — Nithya J. Moll
(74) *Attorney, Agent, or Firm* — Sughrue Mion, PLLC

(57) ABSTRACT

A method of designing a cooling circuit inside a mold that includes therein the cooling circuit that passes through an inlet and an outlet includes a control plane setting step, a reference plane setting step, an intersection line extraction step, and a circuit setting step. The control plane setting step sets a control plane that is perpendicular to the mold surface on the side which comes in contact with a material and that passes through the inlet and the outlet. The reference plane setting step sets a reference plane that is offset by a fixed distance from the mold surface to the inside of the mold. In the intersection line extraction step, an intersection line at which the control plane and the reference plane intersect is extracted. In the circuit setting step, the cooling circuit is set inside the mold along the intersection line.

10 Claims, 10 Drawing Sheets

(51) Int. Cl.
    *B29C 35/16*     (2006.01)
    *G06F 30/10*     (2020.01)
    *B29C 33/04*     (2006.01)
    *G06F 113/14*     (2020.01)

(52) U.S. Cl.
    CPC .............. *B29C 35/16* (2013.01); *G06F 30/10* (2020.01); *G06F 2113/14* (2020.01)

(58) Field of Classification Search
    CPC ................. G06F 30/10; G06F 2113/22; G06F 2119/08; G06F 30/39
    See application file for complete search history.

(56) References Cited

FOREIGN PATENT DOCUMENTS

| | | |
|---|---|---|
| JP | 07-080847 A | 3/1995 |
| JP | 08-022487 A | 1/1996 |
| JP | 2012-203547 A | 10/2012 |

OTHER PUBLICATIONS

Li, C. L., C. G. Li, and A. C. K. Mok. "Automatic layout design of plastic injection mould cooling system." Computer-Aided Design 37.7 (2005): 645-662.*

Wang, Yu, et al. "Automatic design of conformal cooling circuits for rapid tooling." Computer-Aided Design 43.8 (2011): 1001-1010.*

Dimitrov, D., A. Moammer, and T. Harms. "Cooling channel configuration in injection moulds." Innovative developments in design and manufacturing. CRC Press, 2009. 373-378.*

\* cited by examiner

MOLD COOLING CIRCUIT DESIGNING METHOD, MOLD MANUFACTURING METHOD, MOLD COOLING CIRCUIT DESIGNING APPARATUS, AND COMPUTER READABLE MEDIUM

CROSS REFERENCE TO RELATED APPLICATIONS

This application is based upon and claims the benefit of priority from Japanese patent application No. 2019-129056, filed on Jul. 11, 2019, the disclosure of which is incorporated herein in its entirety by reference.

BACKGROUND

The present disclosure relates to a mold cooling circuit designing method, a mold manufacturing method, a mold cooling circuit designing apparatus, and a computer readable medium.

Japanese Unexamined Patent Application Publication No. H8-022487 discloses a cooling piping arrangement method for arranging a cooling pipe formed of an injection mold based on a mold model which is a three-dimensional solid model of an injection mold. In the method disclosed in Japanese Unexamined Patent Application Publication No. H8-022487, a piping start surface and a piping start position for each of a plurality of cooling piping at the piping start surface are set in a mold model, and a cross-section in the piping direction of the mold model that includes these start positions and that is perpendicular to the piping start surface is created for each start position. In this method, a cooling path is created for each of the cross-sections in the piping direction with the start position as the starting point based on a predetermined rule for keeping the distance from the cooling piping to the product surface constant according to the configuration of the mold model.

SUMMARY

However, in the method disclosed in Japanese Unexamined Patent Application Publication No. H8-022487, it is necessary to repeatedly perform the same processing in order to keep a distance from the mold surface to the cooling piping (the cooling circuit) constant, and thus a cooling circuit cannot be configured easily.

Therefore, an object of the present disclosure is to provide a mold cooling circuit designing method etc. by which a cooling circuit can be readily configured in such a way that a distance from a mold surface to the cooling circuit configured inside a mold is kept constant when designing the cooling circuit of the mold.

A first exemplary aspect for solving the problem described above is a mold cooling circuit designing method for designing a cooling circuit in a mold, the cooling circuit in the mold passing through an inlet and an outlet, the method including:

a control plane setting step of setting a control plane that is perpendicular to a mold surface which is a side that comes in contact with a material and that passes through the inlet and the outlet;

a reference plane setting step of setting a reference plane that is offset by a fixed distance from the mold surface to the inside of the mold;

an intersection line extraction step of extracting an intersection line at which the control plane and the reference plane intersect; and a circuit setting step of setting the cooling circuit inside the mold along the intersection line.

In the mold cooling circuit designing method according to this aspect, the intersection line is extracted by setting the control plane and the reference plane, and the cooling circuit is set along the intersection line. Therefore, according to this aspect, the cooling circuit can be readily set in such a way that a distance from the mold surface to the cooling circuit disposed inside the mold is kept constant when designing the cooling circuit of the mold.

The control plane setting step includes: a point arranging step of arranging a control point between the inlet and the outlet; and a connecting step of connecting the inlet, the control point, and the outlet in this order. According to this aspect, the cooling circuit has the control point arranged therein and is configured to be bendable. By this configuration, it is possible to cool the desired part as well as expand an area of the cooling.

The point arranging step is a step of arranging a plurality of control points; and the connecting step is a step of connecting the inlet, the plurality of control points arranged in the point arranging step, and the outlet in this order. According to this aspect, the cooling circuit has a control point arranged therein and is configured to be bendable. By this configuration, it is possible to cool the desired part as well as expand an area of the cooling.

The point arranging step includes: a step of arranging a first control point within a first region where the inlet and the outlet are disposed diagonally; and a step of arranging a second control point within a second region where the first control point and either one of the outlet or the inlet are arranged diagonally. According to this aspect, the cooling circuit in which at least two control points that oppose either one of the outlet or the inlet are arranged and that is bendable is formed. By this configuration, it is possible to avoid creation of a cooling circuit in which cooling performance is lowered due to the crossing of the flow channels and due to the increase in the pressure loss owing to the flow channels being bent sharply.

Alternatively, the point arranging step includes: a step of arranging a first control point within a first region where the inlet and the outlet are disposed diagonally; and a step of repeating the step of arranging an i-th control point within an i-th region where an (i−1)-th control point and either one of the outlet or the inlet are disposed diagonally from when i is equal to 2 until i is equal to n, the number of control points to be arranged being n (n is an integer of 2 or larger) and i being a variable of an integer between 2 to n. According to this aspect, the cooling circuit that includes a plurality of control points arranged therein so as to oppose either one of the outlet or the inlet and that is configured to be bendable is formed. By this configuration, it is possible to avoid creation of a cooling circuit in which cooling performance is lowered due to the crossing of the flow channels and due to the increase in the pressure loss owing to the flow channels being bent sharply.

The circuit setting step includes a step of setting an inlet line that joins the inlet and a bottom surface opposing the mold surface and an outlet line that joins the outlet and the bottom surface opposing the mold surface, and setting an inlet side and an outlet side of the cooling circuit along the respective inlet and outlet lines that are set. According to this aspect, the inlet side and the outlet side are set for the cooling circuit. By this configuration, it is possible to arrange the inlet and the outlet of the cooling circuit at positions where they do not interfere with the other components.

A second exemplary aspect is a mold manufacturing method including a step of forming the cooling circuit designed by the mold cooling circuit designing method. According to this aspect, a mold including therein the cooling circuit designed as described above can be manufactured.

A third exemplary aspect is a mold cooling circuit designing apparatus configured to design a cooling circuit in a mold, the cooling circuit in the mold passing through an inlet and an outlet, the apparatus including:

a control plane setting unit configured to set a control plane that is perpendicular to a mold surface which is a side that comes in contact with a material and that passes through the inlet and the outlet;

a reference plane setting unit configured to set a reference plane that is offset from the mold surface to the inside of the mold by a fixed distance;

an intersection line extraction unit configured to extract an intersection line at which the control plane and the reference plane intersect; and a circuit setting unit configured to set the cooling circuit inside the mold along the intersection line.

In the mold cooling circuit designing apparatus according to this aspect, the intersection line is extracted by setting the control plane and the reference plane and the cooling circuit is set along the intersection line. Therefore, according to this aspect, the cooling circuit can be readily set in such a way that a distance from the mold surface to the cooling circuit disposed inside the mold is kept constant when designing the cooling circuit of the mold.

A fourth exemplary aspect is a program for causing a computer to execute a designing process of designing a cooling circuit that passes through an inlet and an outlet inside a mold, the designing process including:

a control plane setting step of setting a control plane that is perpendicular to a mold surface which is a side that comes in contact with a material and that passes through the inlet and the outlet;

a reference plane setting step of setting a reference plane that is offset from the mold surface to the inside of the mold by a fixed distance;

an intersection line extraction step of extracting an intersection line at which the control plane and the reference plane intersect; and a circuit setting step of setting the cooling circuit inside the mold along the intersection line.

In the program according to this aspect, the intersection line is extracted by setting the control plane and the reference plane and the cooling circuit is set along the intersection line. Therefore, according to this aspect, a cooling circuit can be readily set in such a way that a distance from a mold surface to the cooling circuit disposed inside the mold is kept constant when designing the cooling circuit of the mold.

According to the present disclosure, it is possible to provide a mold cooling circuit designing method etc. by which a cooling circuit can be readily set in such a way that a distance from a mold surface to the cooling circuit disposed inside the mold is kept constant when designing the cooling circuit of the mold.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinbelow, the present disclosure will be explained through the embodiments of the present disclosure, however, the disclosure according to the claims is not to be limited to the embodiments mentioned below. Further, not all of the structures described in the embodiments are necessary in solving the problem. Hereinbelow, embodiments of the present disclosure are explained with reference to the figures.

First Embodiment

Figure 1:
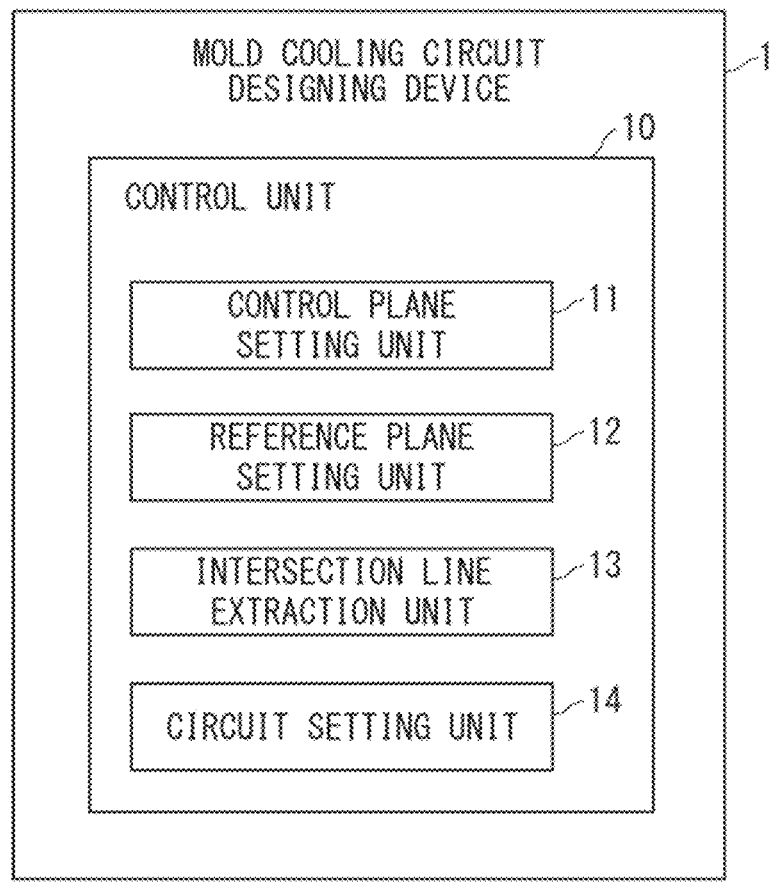
FIG. 1 is a block diagram showing an example of a configuration of a mold cooling circuit designing apparatus according to a first embodiment.

A first embodiment is explained with reference to FIGS. 1 to 5. FIG. 1 is a block diagram showing an example of a configuration of a mold cooling circuit designing apparatus according to the present embodiment.

As shown in FIG. 1, the mold cooling circuit designing apparatus 1 according to the present embodiment is a apparatus that designs a cooling circuit which is formed inside the mold and which passes through an inlet and an outlet, and includes a control plane setting unit 11, a reference plane setting unit 12, an intersection line extraction unit 13, and a circuit setting unit 14.

Designing can be performed, for example, based on a three-dimensional model data representing a mold. As the three-dimensional model data various data of various forms, for example, a 3D-CAD (Computer Aided Design) data, can be employed. Note that the cooling circuit can be a flow channel (a pipe) for letting a cooling medium flow therethrough and can also be referred to as a cooling pipe, a cooling piping, a cooling circuit pipe, a piping pattern, a piping route or the like.

Each of the units 11 to 14 can be provided to, for example, a control unit 10 that controls the whole mold cooling circuit designing apparatus 1. The control unit 10 is realized by, for example, a processor such as a CPU (Central Processing Unit), a working memory, a non-volatile storage device, etc. or by an integrated circuit. The control unit 10 can perform its functions by storing a control program to be executed by the processor in the aforementioned storage device and causing the processor to read-out the control program to the working memory. The control unit 10 is not limited to this example and may be configured in any way as long as it can perform the function of controlling the whole or a part of the mold cooling circuit designing apparatus 1. It is to be noted that the control unit 10 includes the functions of each of the control plane setting unit 11, the reference plane setting unit 12, the intersection line extraction unit 13, and the circuit setting unit 14.

Further, the aforementioned storage device can also store a three-dimensional model data representing a mold before a cooling circuit thereof is designed and a three-dimensional model data representing a mold that includes a designed cooling circuit. Note that the description format of the three-dimensional model data can be in any format as long as the data can be interpreted by at least the units (parts) 11 to 14 of the control unit 10.

The three-dimensional model data representing the mold before the cooling circuit thereof is designed can also be read out from, for example, a storage device that is externally connected to the mold cooling circuit designing apparatus 1, in which case the three-dimensional model data representing the mold including the designed cooling circuit can be written into the storage device. Alternatively, the storage device can be provided to an external apparatus such as a server apparatus or an information processing apparatus.

Next, each of the units 11 to 14 are described.

The control plane setting unit 11 sets a control plane that is perpendicular to the mold surface which is the side that comes in contact with a material and that passes through the inlet and the outlet. The control plane setting unit 11 sets the control plane that satisfies this condition, however, it is not limited thereto and other conditions can be added.

The reference plane setting unit 12 sets the reference plane that is offset from the mold surface to the inside of the mold by a fixed distance. Even when the mold surface is not a continuous flat surface, for example, being curved or stepped, the reference plane to be set is set at a position that is a distance away from the mold surface to the inside of the mold by a fixed distance.

The intersection line extraction unit 13 extracts the intersection line at which the control plane and the reference plane intersect. The circuit setting unit 14 sets the cooling circuit inside the mold along the intersection line. The circuit setting unit 14 can, for example, set a pipe having a central axis which is the intersection line and having a cross-section of a predetermined shape such as a circle having a prescribed radius or a rectangle having a prescribed long-side length as the cooling circuit.

Hereinbelow, the method of designing a mold cooling circuit according to the present embodiment which can be implemented by the mold cooling circuit designing apparatus 1 (hereinbelow referred to as the present method) is explained.

The present method is a method of designing a cooling circuit inside a mold that includes therein the cooling circuit that passes through the inlet and the outlet, and the method includes a control plane setting step, a reference plane setting step, an intersection line extraction step, and a circuit setting step, which are described below. The present method, for example, can serve as a method of creating a cooling circuit in the three-dimensional model data representing the mold. Note that in the present method, the object of the "setting" can be the object of "creation" in the three-dimensional model data.

In the control plane setting step, for example, the control plane setting unit 11 sets a control plane that is perpendicular to the mold surface which is the side that comes in contact with a material and that passes through the inlet and the outlet. That is, the set control plane is perpendicular to the mold surface which is the side that comes in contact with a material and the set control plane passes through the inlet and the outlet. In the aforementioned reference plane setting step, for example, the reference plane setting unit 12 sets the reference plane that is offset from the mold surface to the inside of the mold by a fixed distance. In the aforementioned intersection line extraction step, for example, the intersection line extraction unit 13 extracts the intersection line at which the control plane and the reference plane intersect. In the aforementioned circuit setting step, for example, the circuit setting unit 14 sets the cooling circuit inside the mold along the intersection line.

As explained above, according to the present embodiment, the cooling circuit can be readily set in such a way that a distance from the mold surface to the cooling circuit disposed inside the mold is kept constant when designing the cooling circuit of the mold. That is, according to the present embodiment, the cooling circuit can be readily set in such a way that a distance from the mold surface to the cooling circuit disposed inside the mold is kept constant.

Figure 2:
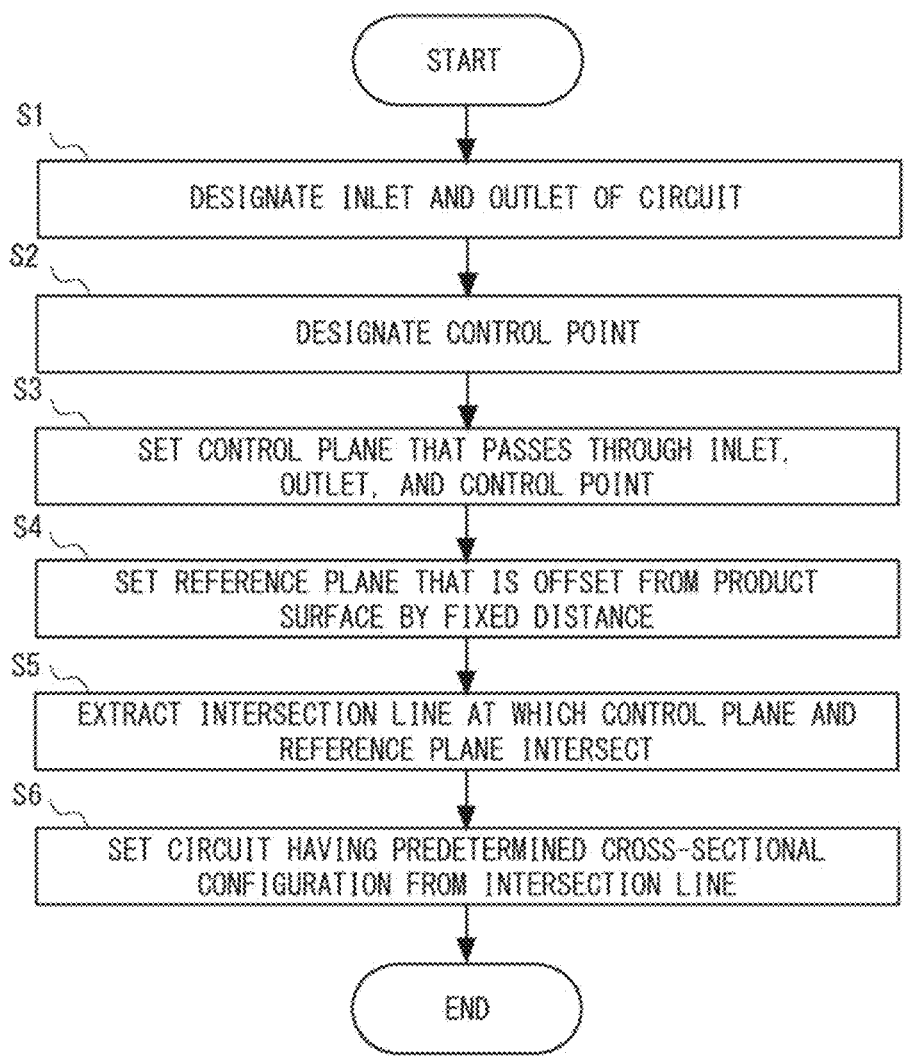
FIG. 2 is a flow chart for explaining an example of a mold cooling circuit designing method according to the first embodiment.
Figure 3:
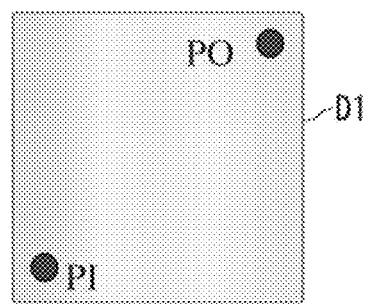
FIG. 3 is a schematic diagram showing an example of a circuit positioning state in each of Steps S1 to S4 shown in FIG. 2.
Figure 3:
Figure 3:
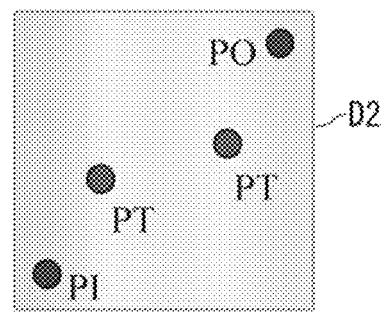
Figure 3:
Figure 3:
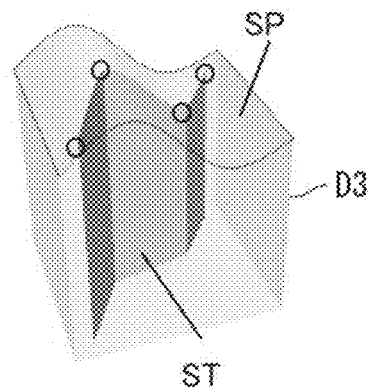
Figure 3:
Figure 3:
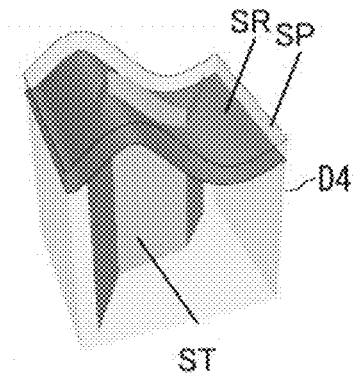
Figure 4:
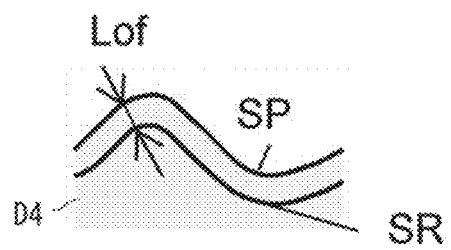
FIG. 4 is a schematic diagram showing a cross-section of an example of the circuit positioning state in Step S4 shown in FIG. 2.
Figure 5:
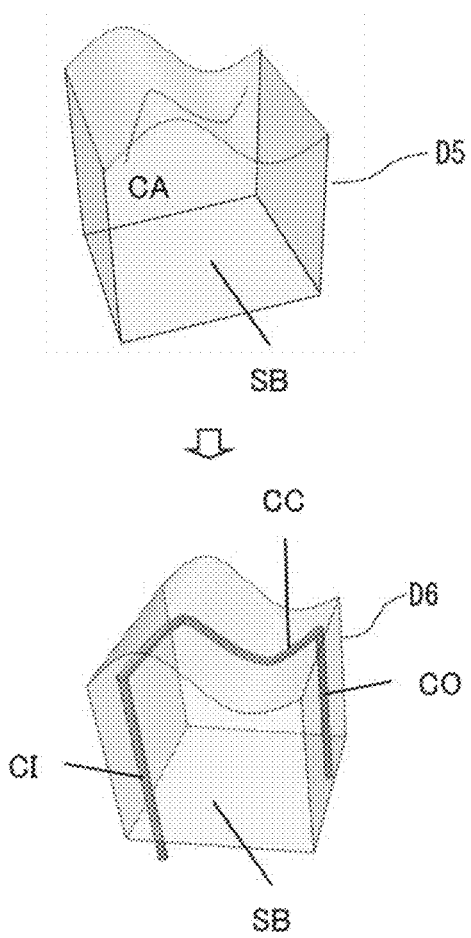
FIG. 5 is a schematic diagram showing an example of the circuit positioning state in each of Steps S5 and S6 shown in FIG. 2.

Next, specific example of the present method is explained with reference to FIGS. 2 to 5. FIG. 2 is a flow chart for explaining the present method. Further, FIG. 3 is a schematic diagram showing an example of a circuit positioning state in each of Steps S1 to S4 shown in FIG. 2, and FIG. 4 is a schematic diagram showing a cross-section of an example of the circuit positioning state in Step S4 shown in FIG. 2. FIG. 5 is a schematic diagram showing an example of the circuit positioning state in each of Steps S5 and S6 shown in FIG. 2. Note that in FIGS. 3 to 5 and the below-mentioned FIG. 7 etc., each circuit positioning state is shown as an example of a state in which the three-dimensional model data of the mold represented by three axes of xyz while the cooling circuit is being designed or after the cooling circuit has been designed is illustrated.

First, an inlet PI and an outlet PO of the cooling circuit are designated as exemplified in a circuit positioning state D1 shown in FIG. 3 which is viewed in the z-axis direction (Step S1). This designation can be accepted by having a user operate an operation unit, which is not shown, provided to the mold cooling circuit designing apparatus 1. Note that, the inlet PI and the outlet PO can be automatically designated according to a predetermined rule. For example, the inlet PI may be disposed in a prescribed orientation at a prescribed distance from one end of the mold surface and the outlet PO may be in another orientation at another prescribed distance from the other end of the mold surface. Note for the sake of simplification, the explanation given below is on the assumption that the inlet PI and the outlet PO are one set, however, a plurality of sets may be used.

Next, a control point PT different from the inlet PI and the outlet PO is designated as exemplified in a circuit positioning state D2 shown in FIG. 3 which is viewed in the z-axis direction (Step S2). The control point PT can be used to set a control plane ST to be described later. The control point PT can be set (arranged) automatically by being designated through the user's operation or by being, for example, brought to a point that is in further another prescribed orientation and further another prescribed distance from the inlet PI or the outlet PO. The control point PT is set so as to pass the part desired to be cooled or to bend the circuit so that the area to be cooled expanded. Therefore, the number of the control points PT is not necessary one and a plurality of control points PT can be set. When the control point PT is set automatically, the user can designate the number of control points PT arbitrary.

Next, the control plane ST, which is a plane that passes through the inlet PI, the outlet PO, and the control point PT, is set (created in the model) as exemplified in a circuit positioning state D3 shown in FIG. 3 which is viewed in a perspective direction (Step S3). The control plane ST is a plane that is perpendicular to a product surface SP as exemplified in the circuit positioning state D3. Note that the product surface refers to a surface layer of the mold (a mold surface).

Further, the step of setting the control plane ST in Step S3 includes a step of connecting the control points PT one by one. That is, the control plane setting step can include a step of arranging the control points PT between the inlet PI and the outlet PO and a step of connecting the inlet PI, the control points PT, and the outlet PO in this order. Note that here, the connecting step corresponds to the step of connecting the control points PT that are arranged from the inlet PI to the outlet PO, and at least one control point PT can be arranged. By employing the control plane setting step, the cooling circuit can be made bendable by arranging the control points PT, whereby it becomes possible to cool the desired part as well as expand the area of the cooling.

Specifically, as described above, the point arranging step may be a step of arranging the plurality of control points PT and the connecting step may be a step of connecting the inlet PI, the plurality of arranged control points PT, and the outlet PO in this order. By this configuration, the cooling circuit can be made bendable by arranging the plurality of control points PT, whereby it becomes possible to cool the desired part as well as expand the area of the cooling.

Following Step S3, a reference plane SR that is offset from the product surface SP in the plane-perpendicular direction by a fixed distance Lof is set (created in the model) as exemplified in a circuit positioning state D4 shown in FIG. 3 which is viewed in a perspective direction (Step S4). Here, the plane-perpendicular direction is a direction from the product surface SP to the direction facing the inside of the mold and which is perpendicular to the product surface SP. FIG. 4 shows an example of a cross-section of a yz plane in the circuit positioning state D4. By this configuration, the reference plane SR that is parallel to the product surface SP can be set.

Next, the intersection line CA at which the control plane ST and the reference plane SR intersect is extracted as exemplified in a circuit positioning state D5 shown in FIG. 5 (Step S5). Finally, a cooling circuit CC having a predetermined cross-sectional configuration is set (created in the model) with the extracted intersection line CA being the axis as exemplified in a circuit positioning state D6 shown in FIG. 5 (Step S6). Step S6 is an example of the circuit setting step.

The cross-sectional configuration can be determined based on the minimum necessary values among, for example, the area of the cross-section, the cross-sectional diameter in the case of a circular configuration, the major axis and the minor axis in the case of an oblong configuration, the length of each side and the angles formed by the sides in the case of a rectangular configuration, and the like. Further, the cross-sectional configuration can be determined in advance (before Step S6) by designating the value and the configuration like those that are exemplified above through the user's operation or according to the default setting value. Further, the intersection line CA can be made to be the center of the cooling circuit, in which case it can be referred to as a central axis or central line. However, the position of the intersection line CA in the cross-sectional configuration can also be determined in advance (before Step S6) through the user's operation or according to the default setting value to be, for example, at one edge (for example, the bottom edge) of the cross-sectional configuration.

Further, the circuit setting step exemplified in Step S6 can include a step of setting an inlet line and an outlet line before or after the step of setting the cooling circuit CC disposed between the inlet PI and the outlet PO. Here, the inlet line refers to a line joining the inlet PI and a bottom surface SB that opposes a mold surface SP (a line joining an extended line and the bottom surface SB, the extended line being a line that perpendicularly joins the mold surface SP and the inlet PI). Similarly, the outlet line refers to a line joining the outlet PO and the bottom surface SB that opposes the mold surface SP of the outlet PO.

In this case, the circuit setting step can further include a step of setting each of the inlet side and the outlet side of the cooling circuit along the inlet line and the outlet line that are set. Here, for example, the inlet side of the cooling circuit can be made to be an inlet side cooling circuit CI and the outlet side of the cooling circuit can be made to an outlet side cooling circuit CO as exemplified in the circuit positioning state D6 shown in FIG. 5.

Further, as understood from the aforementioned example, the inlet side cooling circuit CI and the outlet side cooling circuit CO do not include the intersection line CA except the ends thereof (each being the inlet PI and the outlet PO), and are not formed around the intersection line CA. Accordingly, it becomes possible to dispose the inlet PI and the outlet PO of the cooling circuit at a part where the cooling function is actually necessary to be at positions where they do not interfere with the other components. Note that the inlet side cooling circuit CI and the outlet side cooling circuit CO may both have the same sectional configuration as that of the cooling circuit CC, or may have different sectional configurations.

The mold cooling circuit designing apparatus 1 and the present method have been explained above, and the present embodiment can be applied to a mold manufacturing method or a mold manufacturing apparatus. The mold manufacturing method according to the present embodiment includes a step of forming, inside the mold, a cooling circuit designed by the mold cooling circuit designing method. By this configuration, the mold including the cooling circuit designed as described above can be manufactured. Note that the timing at which the cooling circuit is formed and the timing at which the mold is formed may be the same. Further, in the mold manufacturing method, the apparatus used to form the cooling circuit in the mold or the mold manufacturing apparatus that manufactures the mold including the cooling circuit may be any apparatus. In other words, the mold manufacturing apparatus according to the present embodiment may have any configuration as long as it has a configuration in which a cooling circuit designed by the mold cooling circuit designing apparatus 1 is formed inside the mold.

Second Embodiment

A second embodiment is explained with reference to FIGS. 6 to 11. This embodiment is explained mainly on its difference between the first embodiment, and various modifications explained in the first embodiment such as the basic configuration of the mold cooling circuit designing apparatus 1 and the application of the circuit to the mold manufacturing apparatus and the mold manufacturing method can be applied.

In the method of designing a mold cooling circuit according to the present embodiment (hereinbelow referred to as the present method), the point arranging step includes a step of arranging a first control point within a first region where the inlet PI and the outlet PO are disposed diagonally and a repeating step described below. The aforementioned repeating step is a step of repeating the step of arranging an i-th control point within an i-th region where an (i−1)-th control point and either one of the outlet PO or the inlet PI are disposed diagonally from when i is equal to 2 until i is equal to n. Here, n is a number of control points to be arranged and is an integer equal to or larger than 2. Further, i is a variable of an integer between 2 to n.

Note that in the aforementioned example, explanation is given on the assumption that either one of the aforementioned outlet PO or the inlet PI is always the same regardless of the value i, for example, it is possible to perform the repeating step by exchanging either one of the outlet PO or the inlet PI (between the outlet PO and the inlet PI) as the value i increases. Further, the first region and the i-th region may both be a rectangular region when viewed two-dimensionally, however, it is not limited thereto and the shapes of regions can be any arbitrary shape as long as the inlet and the outlet can be disposed diagonally. Note that these regions can be handled as a two-dimensional region since the points are arranged diagonally in these regions, however they can be handled as a three-dimensional region when they are represented by the three-dimensional coordinates system.

Figure 6:
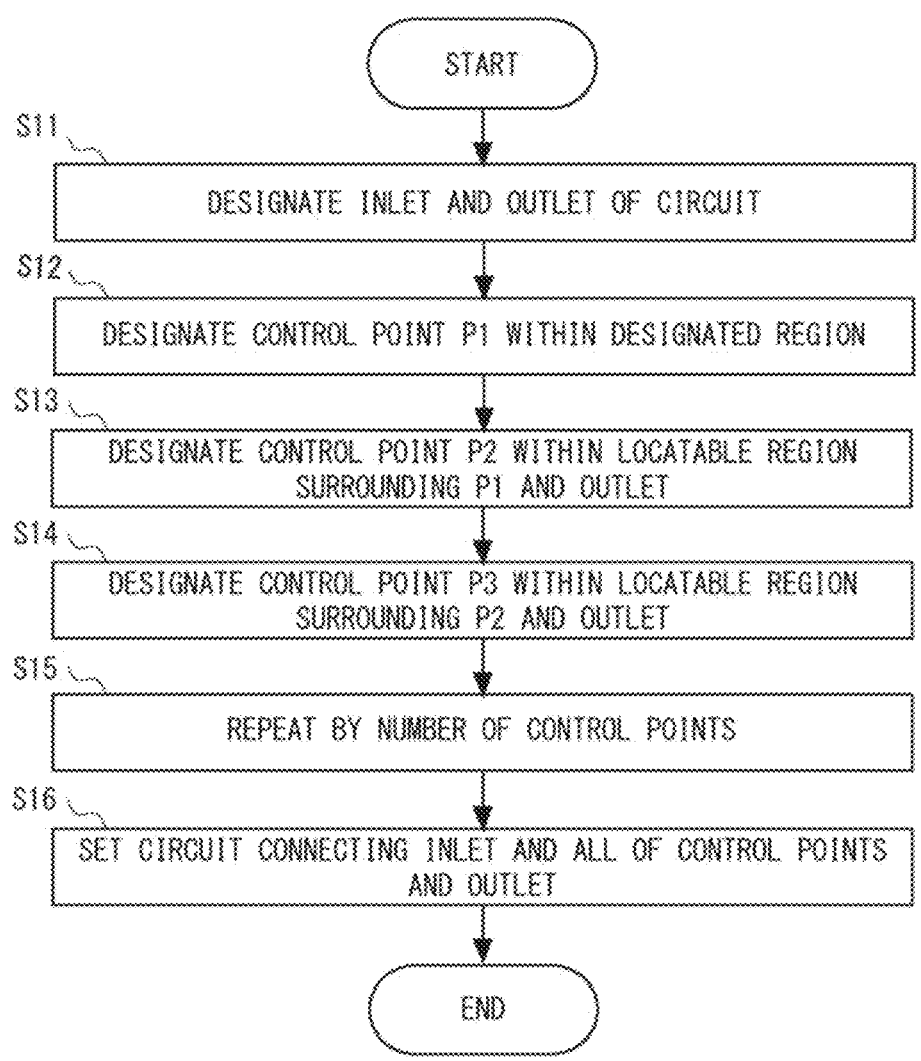
FIG. 6 is a flow chart for explaining an example of a mold cooling circuit designing method according to a second embodiment.

Next, specific example of the present method is explained with reference to FIGS. 6 and 7 etc. FIG. 6 is a flow chart for explaining an example of the present method. Further, FIG. 7 is a schematic diagram showing an example of the circuit positioning state in each of Steps S11 to S14 shown in FIG. 6.

Figure 7:
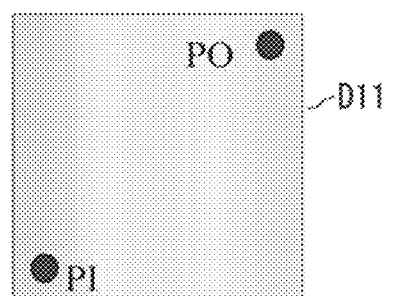
FIG. 7 is a schematic diagram showing an example of the circuit positioning state in each of Steps S11 to S14 shown in FIG. 6.
Figure 7:
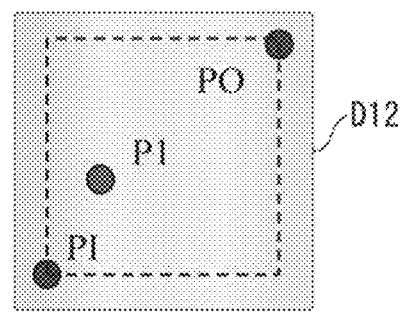
Figure 7:
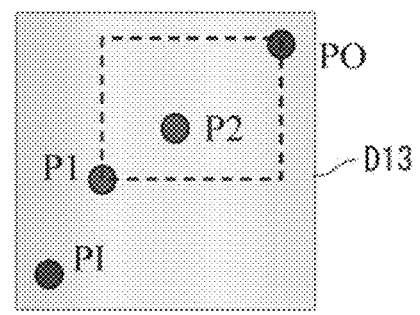
Figure 7:
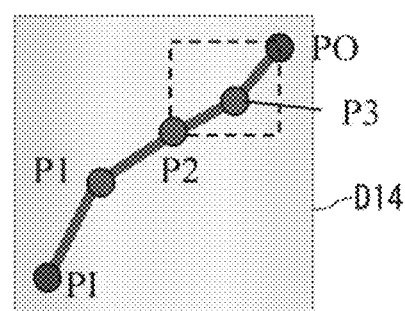

First, the inlet PI and the outlet PO of the cooling circuit are designated as exemplified in a circuit positioning state D11 shown in FIG. 7 (Step S11). Note that Step 11 can be performed in a manner similar to Step S1.

Next, as exemplified in a circuit positioning state D12 shown in FIG. 7, a control point P1 is designated within a designated region (a first region surrounded by the dotted lines) where the inlet PI and the outlet PO are disposed diagonally (Step S12). Therefore, the first region is set to begin with, and the setting can be performed according to a prescribed rule (for example, a rule such as adopting a prescribed shape etc.) as long as the aforementioned conditions on disposing the inlet and the outlet diagonally are satisfied.

Further, the control point P1 can be designated by the user's operation of a display unit (not shown) after indicating the first region on the display unit, or it can be set (arranged) automatically. The method of automatically arranging the control point can be any method. For example, the position of the control point can be obtained by obtaining a position that is near the inlet PI side by a prescribed ratio on a straight line from the inlet PI to the outlet PO within the first region and then spacing apart therefrom by a prescribed distance toward a direction that is perpendicular to the straight line.

Next, as exemplified in a circuit positioning state D13 shown in FIG. 7, a control point P2 is designated within a locatable region surrounding the control point P1 and the outlet PO (a second region surrounded by the dotted lines) (Step S13). The same rule as that applied to the first region (or another rule that is separately defined) can be set for the second region. The control point P2 can be set (arranged) automatically by the user's operation after the second region is indicated to the user or, for example, according to a rule adopted in designating the first control point P1 in the first region or another rule.

Figure 8:
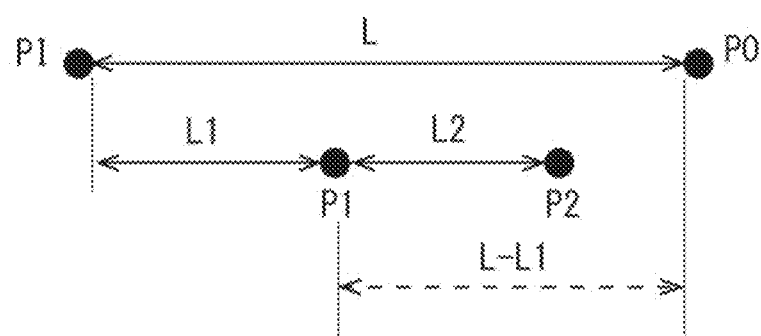
FIG. 8 is a schematic diagram showing an example of arranging the control points in Step S13 shown in FIG. 6.

An example of arranging the control point P2 with respect to the control point P1 is explained with reference to FIG. 8. FIG. 8 is a schematic diagram showing an example of arranging the control point in Step 13. For example, as shown in FIG. 8, L denotes a distance connecting the inlet PI and the outlet PO, L1 denotes a distance between the inlet PI and the control point P1, and L2 denotes a distance between the control points P1 and P2.

In this case, by setting a semi-independent variable a that satisfies $L2=\alpha(L-L1)$ and $0 \leq \alpha \leq 1$ in advance before setting the control point P2 when determining the position of the control point P2, the control point P2 can be arranged while satisfying the condition of being within the second region. The semi-independent variable a exemplifies a variable in the 3D-CAD, and a variable obtained by the same approach can be used when using other three-dimensional model data. Note that the same approach can be adopted in the example of setting the control point P1 in Step S12.

Next, as exemplified in a circuit positioning state D14 shown in FIG. 7, a control point P3 is designated within a locatable region surrounding the control point P2 and the outlet PO (a third region surrounded by the dotted lines) (Step S14). The method of designating the control point P3 conforms to Step S13.

Thereafter, the process mentioned above is repeated by the n number of the control points to be arranged (Step S15), and finally a circuit that connects the inlet PI, all of the control points, and the outlet PO is set (created in the model) (Step S16). Note that the process can be repeated until the prescribed conditions such as the distance of the circuit to the outlet PO falls within a prescribed distance etc. are met, in which case n is the number of arbitrary control points that satisfy the above-described conditions.

Figure 9:
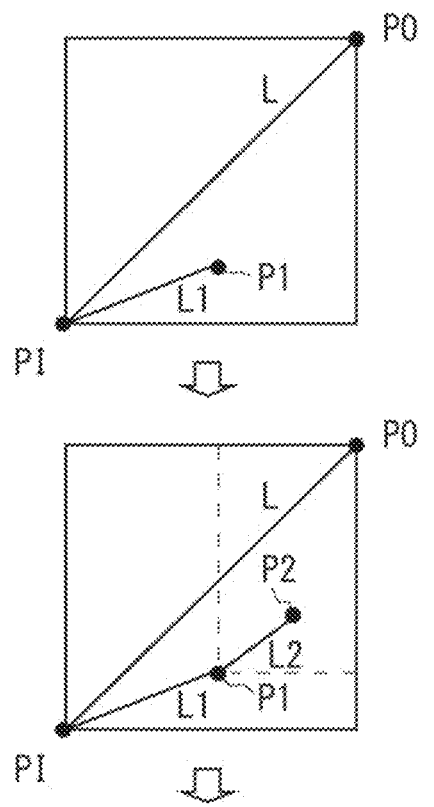
FIG. 9 is a schematic diagram showing an example of the circuit positioning state in each of Steps S11 to S16 shown in FIG. 6.
Figure 9:
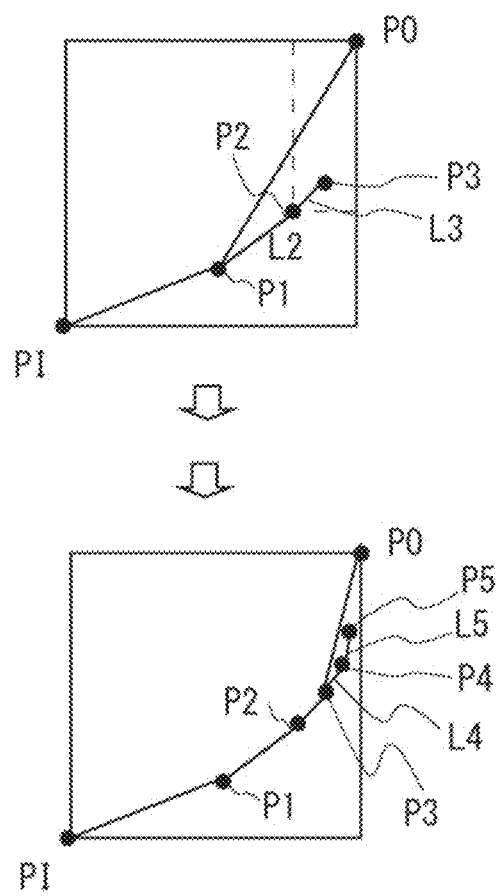

Here, an example of a relation using the semi-independent variable a when obtaining the position of the control point in Step S13 is explained with reference to FIG. 9. FIG. 9 is a schematic diagram showing an example of the circuit positioning state in each of Steps S11 to S16 shown in FIG. 6.

In this example, the following relation is established as regards the position at which the control point i is arranged. That is, when a length of a line segment that connects the inlet PI and the outlet PO is L, a length of a line segment that connects the inlet PI and the first control point P1 is L1, and a length of a line segment that connects the first control point P1 and the second control point P2 is L2, then $L1=\alpha L$ and $L2=\alpha(L-L1)$ can be held. Note that a satisfies $0 \leq \alpha \leq 1$.

Further, as regards the control point beyond the third control point (i.e., the n-th control point Pn, where $n \geq 3$), the distance corresponding to the distance L can be updated by connecting a control point that precedes the control point by two and the outlet PO. Specifically, as regards n≥3, the following holds true.

Ln=α((a length of a line segment connecting Pn−2 and PO)−L(n−1))

In an example shown in FIG. 9 (an example of n=3, 5), the following holds true.

L3=α((a length of a line segment connecting P1 and PO)−L2)

L5=α((a length of a line segment connecting P3 and PO)−L4)

As exemplified herein, when n is equal to or larger than 3, the repeating step can include an addition step described below and a step of repeating the addition step until i becomes n (for the n number of the control points). The aforementioned addition step is a step of arranging the second control point P2 within a region where the first control point P1 and the outlet PO (or the inlet PI) are disposed diagonally.

Figure 10:
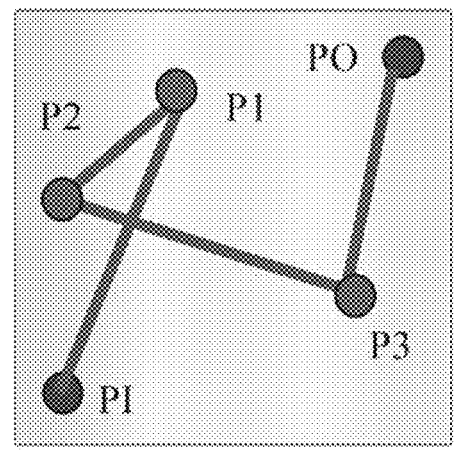
FIG. 10 is a schematic diagram showing an example of a cooling circuit in which flow channels intersect with each other.

Here, for explaining the effect of the present embodiment, a comparative embodiment is explained with reference to FIGS. 10 and 11. FIG. 10 is a schematic diagram showing an example of a cooling circuit in which flow channels intersect with each other, and FIG. 11 is a schematic diagram showing an example of a cooling circuit in which a pressure loss becomes extremely large.

Figure 11:
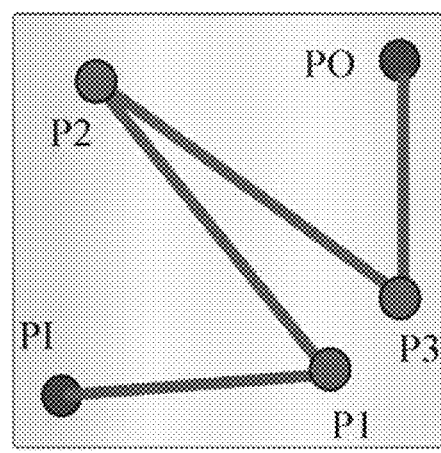
FIG. 11 is a schematic diagram showing an example of a cooling circuit in which a pressure loss becomes extremely large.

In the comparative example that does not adopt the method according to the present embodiments when designing a mold including a cooling circuit therein, the flow channels intersect as shown in FIG. 10 or the pressure loss becomes extremely large owing to the flow channels being bent sharply as shown in FIG. 11. Note that a circuit that is bent sharply refers to a circuit that is bent at an angle larger than 90 degrees or a circuit in which the flow of the refrigerant goes backward in the direction toward the inlet PI when the flow is advancing toward the outlet PO. In this kind of circuit, the flow of the refrigerant becomes slow at the bent part of the circuit, and thus the cooling efficiency drops. As described above, in the comparative example, it is difficult to avoid the pressure loss from becoming extremely large in the mold that includes the cooling circuit (the piping) therein. Therefore, searching for the circuit position like that of the comparative example means that a search for a circuit configuration that is not practical is also made, which leads to a waste of time taken in examining the searched configuration.

Alternatively, in the present embodiment, a cooling circuit that is bent by arranging a plurality of control points towards either one of the outlet PO or the inlet PI is formed as described above. According to the present embodiment, it is possible to avoid creation of a cooling circuit in which cooling performance is lowered due to the crossing of the flow channels and due to the increase in the pressure loss owing to the flow channels being bent sharply.

Alternative Example

Next, alternative examples of the first and the second embodiments described above are explained. In the embodiments described above, an example in which the user operation is performed is given, however, it can be said that it is preferable to perform each step automatically and omit the user operation as much as possible from the viewpoint of saving the labor.

Figure 12:
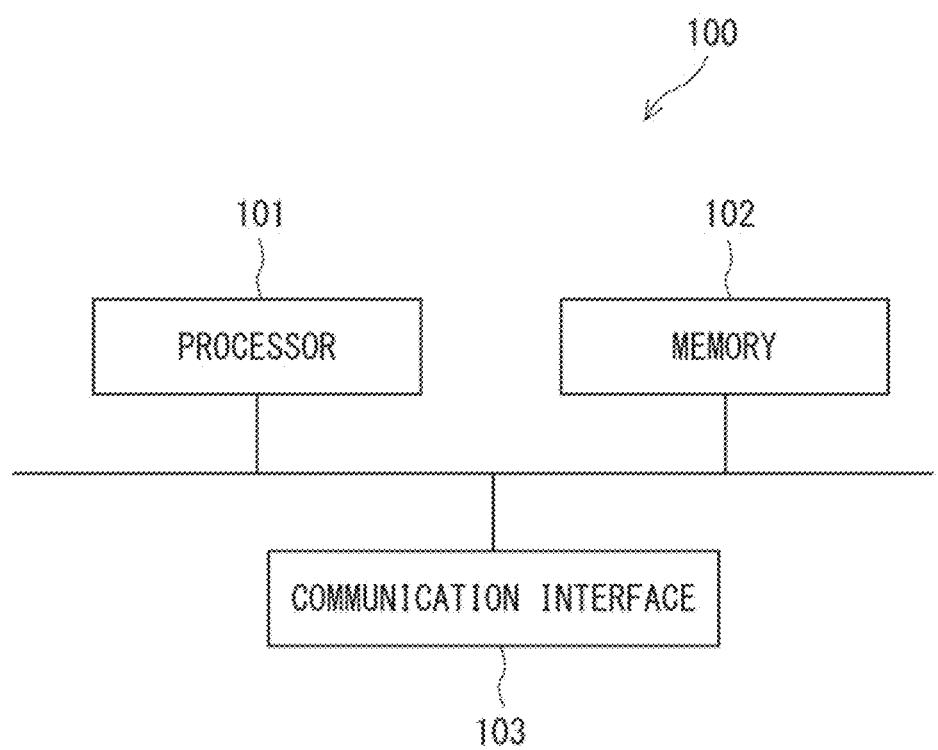
FIG. 12 is a diagram showing an example of a hardware configuration of a mold cooling circuit designing apparatus.

Further, the mold cooling circuit designing apparatus 1 according to each of the embodiments described above is not limited to the one exemplified in FIG. 1 and may be configured in any way as long as it can perform its function. For example, the mold cooling circuit designing apparatuses according to the first and the second embodiments may have a hardware configuration like the one mentioned below. FIG. 12 is a diagram showing an example of a hardware configuration of the mold cooling circuit designing apparatus.

A mold cooling circuit designing apparatus 100 shown in FIG. 12 includes a processor 101, a memory 102, and a communication interface 103. The processor 101 may be, for example, a microprocessor, an MPU (Micro Processor Unit), a CPU or the like. The processor 101 may include a plurality of processors. The memory 102 is configured of, for example, a combination of a volatile memory and a non-volatile memory. The functions of the mold cooling circuit designing apparatuses described in the first and the second embodiments are realized by configuring the processor 101 to read and execute the control program stored in the memory 102. In these circumstances, the input/output of the information on the three-dimensional model data etc. can be performed through the communication interface 103.

The control program can be the control program described in the first embodiment and is a program for causing a computer to execute a designing process of designing a cooling circuit that passes through the inlet and the outlet inside a mold. This designing process may include the control plane setting step, the reference plane setting step, the intersection line extraction step, and the circuit setting step described above. Here, the computer executes each step. Other modified examples are as described above and hence, explanations thereof are omitted.

The control program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A mold cooling circuit designing method for designing a cooling circuit in a mold, the cooling circuit in the mold passing through an inlet and an outlet, the method comprising:

a control plane setting step of setting a control plane that is perpendicular to a mold surface which is a side that comes in contact with a material and that passes through the inlet and the outlet;

a reference plane setting step of setting a reference plane that is offset by a fixed distance from the mold surface to the inside of the mold;

an intersection line extraction step of extracting an intersection line at which the control plane and the reference plane intersect; and a circuit setting step of setting the cooling circuit inside the mold along the intersection line.

2. The mold cooling circuit designing method according to claim 1, wherein the control plane setting step comprises:

a point arranging step of arranging a control point between the inlet and the outlet; and a connecting step of connecting the inlet, the control point, and the outlet in this order.

3. The mold cooling circuit designing method according to claim 2, wherein:

the point arranging step is a step of arranging a plurality of control points; and the connecting step is a step of connecting the inlet, the plurality of control points arranged in the point arranging step, and the outlet in this order.

4. The mold cooling circuit designing method according to claim 3, wherein the point arranging step comprises:

a step of arranging a first control point within a first region where the inlet and the outlet are disposed diagonally; and a step of arranging a second control point within a second region where the first control point and either one of the outlet or the inlet are arranged diagonally.

5. The mold cooling circuit designing method according to claim 3, wherein the point arranging step comprises:

a step of arranging a first control point within a first region where the inlet and the outlet are disposed diagonally; and a step of repeating the step of arranging an i-th control point within an i-th region where an (i-1)-th control point and either one of the outlet or the inlet are disposed diagonally from when i is equal to 2 until i is equal to n, the number of control points to be arranged being n (n is an integer of 2 or larger) and i being a variable of an integer between 2 to n.

6. The mold cooling circuit designing method according to claim 1, wherein the circuit setting step comprises a step of setting an inlet line that joins the inlet and a bottom surface opposing the mold surface and an outlet line that joins the outlet and the bottom surface opposing the mold surface, and setting an inlet side and an outlet side of the cooling circuit along the respective inlet and outlet lines that are set.

7. A mold manufacturing method comprising a step of forming the cooling circuit designed by the mold cooling circuit designing method according to claim 1 inside the mold.

8. A mold cooling circuit designing apparatus configured to design a cooling circuit in a mold, the cooling circuit in the mold passing through an inlet and an outlet, the apparatus comprising:

a processor configured to:

set a control plane that is perpendicular to a mold surface which is a side that comes in contact with a material and that passes through the inlet and the outlet;

set a reference plane that is offset from the mold surface to the inside of the mold by a fixed distance;

extract an intersection line at which the control plane and the reference plane intersect; and set the cooling circuit inside the mold along the intersection line.

9. A mold cooling circuit designing apparatus configured to design a cooling circuit in a mold, the cooling circuit in the mold passing through an inlet and an outlet, the apparatus comprising a processor configured to:

set a control plane that is perpendicular to a mold surface which is a side that comes in contact with a material and that passes through the inlet and the outlet;

set a reference plane that is offset from the mold surface to the inside of the mold by a fixed distance;

extract an intersection line at which the control plane and the reference plane intersect; and set the cooling circuit inside the mold along the intersection line.

10. A non-transitory computer readable medium storing a program for causing a computer to execute a designing process of designing a cooling circuit that passes through an inlet and an outlet inside a mold, the designing process comprising:

a control plane setting step of setting a control plane that is perpendicular to a mold surface which is a side that comes in contact with a material and that passes through the inlet and the outlet;

a reference plane setting step of setting a reference plane that is offset from the mold surface to the inside of the mold by a fixed distance;

an intersection line extraction step of extracting an intersection line at which the control plane and the reference plane intersect; and a circuit setting step of setting the cooling circuit inside the mold along the intersection line.

* * * * *